Nov. 15, 1927.

H. E. BREDEMEIER 1,649,442

MEANS AND METHOD OF LABELING CONTAINERS

Filed May 11, 1926

Inventor
Henry E. Bredemeier.
By Poth & Powers
Attorneys

Patented Nov. 15, 1927.

1,649,442

UNITED STATES PATENT OFFICE.

HENRY E. BREDEMEIER, OF KENMORE, NEW YORK, ASSIGNOR TO SCHREIBER PRODUCTS CORPORATION, OF BUFFALO, NEW YORK, A CORPORATION OF NEW YORK.

MEANS AND METHOD OF LABELING CONTAINERS.

Application filed May 11, 1926. Serial No. 108,303.

This invention relates to a method and means of labeling containers.

It is the object of this invention to enable a housekeeper to utilize containers, such for example as those in which coffee is packed and sold to the consumer, as jars or receptacles for a variety of food products, and to conveniently affix various labels to such containers on defined spaces on the exterior of the same so that a plurality of such containers may be accumulated by a housekeeper for storing various kinds of foods in a neat, orderly and attractive manner.

This manner of labeling containers is more particularly intended for dispensing coffee in containers of sheet metal so that a housekeeper, by making repeated purchases of coffee in containers having provision for applying different labels thereto, will save the containers and use them practically and advantageously for storing other food products and thus effect a considerable economy in materials instead of wasting the same.

In the accompanying drawings.

Similar characters of reference indicate like parts in the several figures of the drawings.

Figure 1:
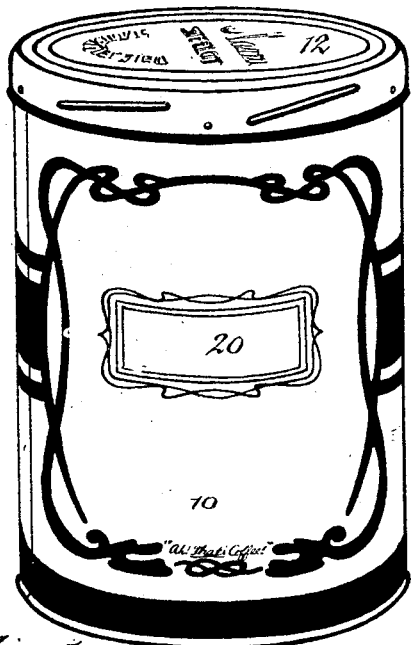
Figure 1 is a perspective view of a container showing its external appearance when filled with coffee for use by the consumer.

Various food products may be packed and labeled in containers in accordance with this invention, but in the following description it will be assumed that coffee has been dispensed originally in the container because this is the commodity in connection with which this invention has the greatest practical and commercial value.

Although the container itself may be variously constructed, the same preferably consists of a cylindrical body 10, a bottom 11 permanently secured to the lower end of the body, and a lid or cover 12 slipped over the upper end of the body, all of the parts being preferably, though not necessarily, constructed of sheet metal.

Within the body and adjacent to the upper end thereof is secured a partition 13 preferably of card board thereby forming a large space 14 in the lower or main part of the body for the reception of the coffee to be packed and shipped to the trade, and a small upper compartment 15. Access to this upper compartment is obtained by slipping the cover from the body and access to the lower or large compartment is obtained by breaking out the partition 13.

Figure 3:
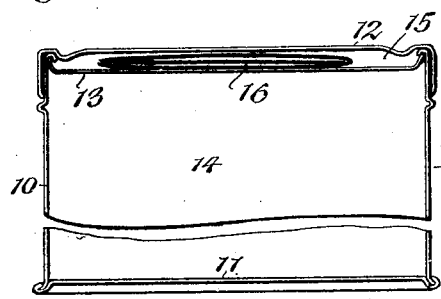
Figure 3 is a fragmentary vertical section of the upper and lower parts of the container showing the manner in which a compartment is formed therein for the storage of a lable which is to be applied to a defined space on the exterior of the container.
Figure 4:
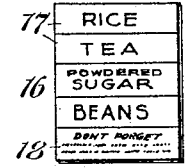
Figure 4 is a perspective view of a comparatively short strip adapted to be placed in the end compartment of a container and to be severed into a plurality of labels any one of which may be affixed to a label space on the exterior of the container.
Figure 5:
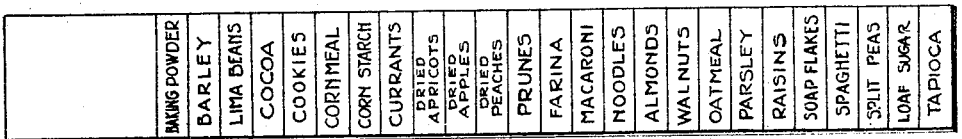
Figure 5 is a comparatively long strip consisting of a plurality of labels adapted to be furnished to a housekeeper for use in designating the contents of containers of the character above mentioned.

In the small upper compartment a comparatively short strip 16 is placed loosely, as shown in Fig. 3, which strip is preferably folded and comprises a plurality of sections some of which consist of labels bearing the names of various food products as shown at 17 in Fig. 4, and one or more of which, as shown for example at 18, may contain descriptive matter, such as directions how to obtain a comparatively long strip as shown at 19 in Fig. 5, containing labels bearing other names of food products upon sending a request to that effect to the packer of the goods shipped in the respective container. These labels are preferably gummed on the back so that upon separating any particular label from the respective strip and wetting the same, this label may be affixed to the exterior of the can or container to designate the contents of the same.

Figure 2:
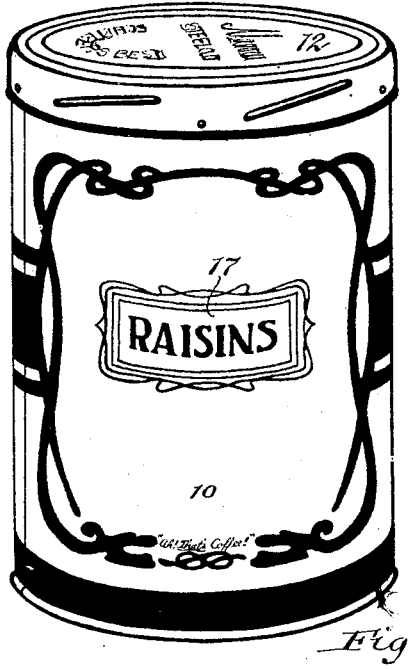
Figure 2 is a similar view showing the manner of affixing a label in a defined space on the exterior of the container for storing another food product after the same has been emptied of the coffee originally packed therein.

For the sake of uniformity and to present an attractive and orderly appearance when a plurality of such containers are placed in a row in a pantry, each of the containers is provided on its exterior with a defined space or panel 20, as shown in Fig. 1 which is adapted to receive the respective label as shown in Fig. 2.

By this means a housekeeper after once starting to purchase the brand of coffee which is dispensed in a container having the labeling advantages of this invention will most likely continue the purchase of the same brand of goods in order to secure additional containers to serve as storage jars for various food products, thus contributing to the ornamental appearance of the kitchen cabinet in which these containers are assembled in rows, promoting orderliness and economy as well as rendering the work of house keeping pleasant and agreeable, and also encouraging the practice of keeping food products in a sealed and sanitary condition.

I claim as my invention:—

A container provided on its exterior with a defined space in which a label is adapted to be fastened, a partition arranged within said container at one end thereof, a cover applied to that end of said container adjacent to which said partition is arranged and forming therewith an end compartment separate from the main space within the container, and a label stored loosely within said compartment and adapted to be secured to the exterior of said container within said defined space.

In testimony whereof I hereby affix my signature.

HENRY E. BREDEMEIER.